US012124917B2

(12) United States Patent
Moulinec

(10) Patent No.: US 12,124,917 B2
(45) Date of Patent: Oct. 22, 2024

(54) SYSTEM FOR CAPTURING IMAGES OF AN OPEN CONTAINER MOVING ON A CONVEYOR

(71) Applicant: VERSA, Saint-Renan (FR)

(72) Inventor: Jacques Moulinec, Brest (FR)

(73) Assignee: VERSA, Saint-Renan (FR)

(*) Notice: Subject to any disclaimer, the term of this patent is extended or adjusted under 35 U.S.C. 154(b) by 0 days.

(21) Appl. No.: 18/269,740

(22) PCT Filed: Feb. 11, 2022

(86) PCT No.: PCT/EP2022/053318
§ 371 (c)(1),
(2) Date: Jun. 26, 2023

(87) PCT Pub. No.: WO2022/171775
PCT Pub. Date: Aug. 18, 2022

(65) Prior Publication Data
US 2024/0095478 A1 Mar. 21, 2024

(30) Foreign Application Priority Data
Feb. 12, 2021 (FR) ...................... 2101355

(51) Int. Cl.
G06K 7/10 (2006.01)
G06K 7/14 (2006.01)
(52) U.S. Cl.
CPC ..... *G06K 7/10722* (2013.01); *G06K 7/10366* (2013.01); *G06K 7/1413* (2013.01)

(58) Field of Classification Search
CPC .......... G06K 7/10366; G06K 7/10425; G06K 7/1417
USPC ................................... 235/375, 385
See application file for complete search history.

(56) References Cited

U.S. PATENT DOCUMENTS

| | | | |
|---|---|---|---|
| 7,137,556 B1* | 11/2006 | Bonner | G07B 17/00661 235/472.01 |
| 2017/0081067 A1* | 3/2017 | Aze | B65B 57/12 |
| 2017/0221030 A1* | 8/2017 | Clark | G07F 7/06 |
| 2019/0102965 A1* | 4/2019 | Greyshock | G07F 11/1657 |
| 2022/0100980 A1* | 3/2022 | Simpson | G06T 7/13 |

FOREIGN PATENT DOCUMENTS

| | | |
|---|---|---|
| EP | 2286932 A2 | 2/2011 |
| EP | 3147838 A1 | 3/2017 |

* cited by examiner

*Primary Examiner* — Paultep Savusdiphol
(74) *Attorney, Agent, or Firm* — H&I PARTNERS; Chai Im; C. Andrew Im

(57) ABSTRACT

A system to capture images of an open container moving on a conveyor. The system includes a conveyor, an open container, and an image-capturing device located above the open container. A barcode reader is configured to read a barcode located on an external face of the container. A display device is configured to display or store at least one captured image and the barcode of the container. A processing unit, including a database, is configured to associate time information with the captured image data. The system triggers an image capture when the open container is proximal to the image-capturing device during the movement of the conveyor.

14 Claims, 1 Drawing Sheet

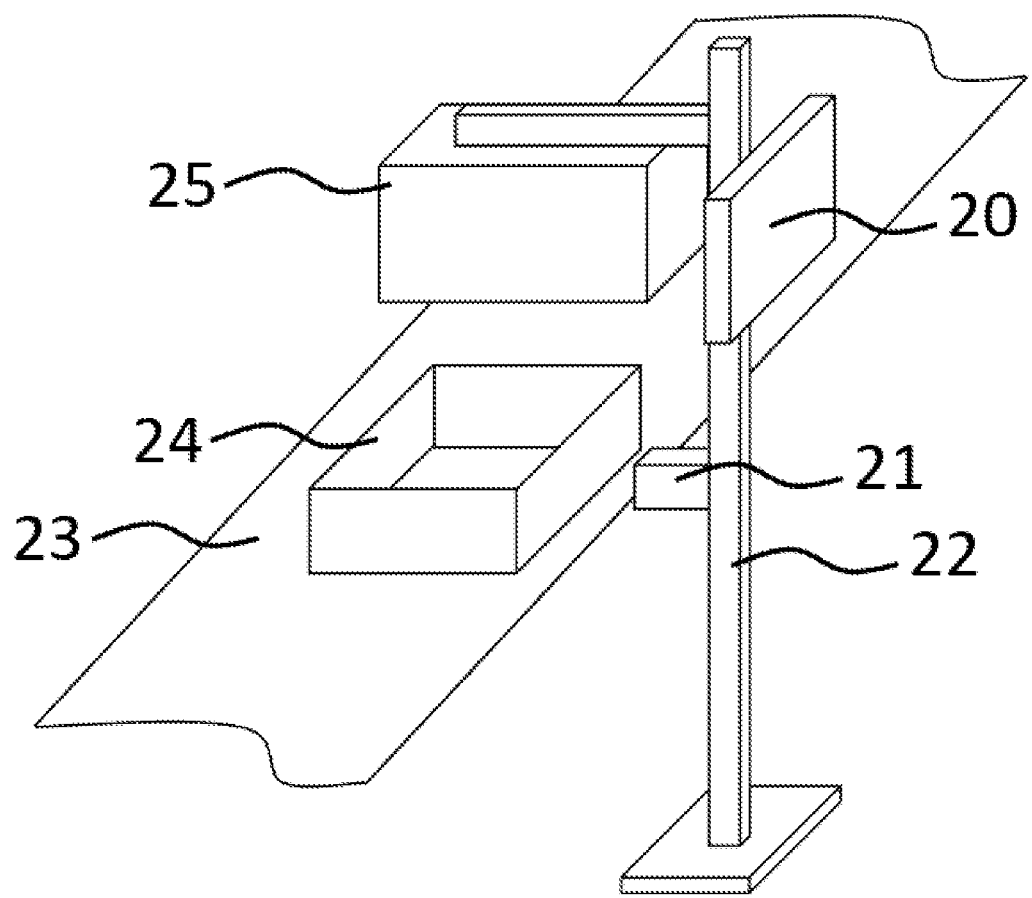

SYSTEM FOR CAPTURING IMAGES OF AN OPEN CONTAINER MOVING ON A CONVEYOR

RELATED APPLICATIONS

This application is a § 371 application of PCT/EP2022/053318 filed Feb. 11, 2022, which claims priority from French Patent Application No. 2101355 filed Feb. 12, 2021, each of which is incorporated herein by reference in its entirety.

TECHNICAL FIELD OF THE INVENTION

The present invention relates to a system for capturing images of an open container moving on a conveyor.

In particular, it applies to all companies, public or private bodies using the transport of goods in handling or packaging units or any other container that could be handled.

BACKGROUND OF THE INVENTION

One of the aims of the invention is to automatically trace the movements of goods during the container closure phase.

For tracing the transport of goods, a prior technique consists in using a container barcode reader without any proof of the contents.

The documents EP3147838 and EP2286932 are known, which create a container according to the dimensions of the contents.

None of the current solutions allows meeting all of the required needs, namely provide proven monitoring of the contents in a container, yet without requiring a prior knowledge of the contents and of the container.

OBJECT AND SUMMARY OF THE INVENTION

The present invention aims to overcome these drawbacks with a completely innovative approach.

More specifically, an objective of the invention is to provide one or more proof(s) of container closure steps.

Another objective of the invention is to provide such a technique which is inexpensive to implement on a system already in place for transporting goods such as a conveyor. The needs are as follows:
  there is no conclusive proof collected automatically without human error that the content is actually present just before closure,
  there is no conclusive proof collected automatically without human error that the content is still in a container after closure during transit thereof (it may be considered and it is possible to open and close a container after closure thereof);
  possess irrefutable quality proof of the order preparation;
  reduce litigations;
  store proofs;
  automatically label the packages with a unique code;
  share and transmit high-resolution photo and video proofs;
  know what is in a closed or sealed container without having to open the containers, or alter it in any way whatsoever
These objectives, as well as others which will appear later on, are achieved with a system for capturing images of an open container moving on a conveyor, including:
  a conveyor;
  an open container including at least one content;
  an image-capturing device located above the open container;
  characterized in that said system further includes:
  a barcode reader configured to read a barcode located on an external face of said container;
  a content unique identification module configured to identify each content;
  a data processing module including a database, said data processing module is configured to:
  store the captured images with the identification of the barcode of the container and the unique identification of each content;
  associate time information with image data derived from each image of the image-capturing device;
  said processing module is configured to trigger an image capture when the open container is proximal to the image-capturing device during movement of the conveyor.

Advantageously, the invention is implemented according to the embodiments and variants disclosed hereinafter, which should be considered individually or according to any technically feasible combination.

Thus, the system is flexible and adapts to any already existing container system. In this case, the container may be created or reused.

In one embodiment, said system includes a module for unique identification of the container amongst at least one of the following elements:
  a RFID-type radio-frequency identification tag, integrated into the container;
  a unique identity card integrated into the container;
  a unique reference to a database formed by a chain of ordered blocks, called blockchain, integrated into the container and readable or detectable from the outside by a wave system.

In one embodiment, the processing module associates a recognition of the container by identification of labels or RFID or blockchain or any other unique identification marking of each container.

In one embodiment, the module for unique identification of the content includes a module configured to identify the shape or the level within the container. This is an uncountable content.

In one embodiment, the module for unique identification of the content includes at least one of the following elements:
  a RFID-type radio-frequency identification tag, integrated into the content;
  a barcode or two-dimensional barcode;
  a unique identity card integrated into the content;
  a unique reference to a database formed by a chain of ordered blocks, called blockchain, integrated into the content and readable or detectable from the outside by a wave system.

In one embodiment, the processing module associates recognition of the content of the open containers by identification of the identification module: labels or RFID or blockchain or any other unique identification marking of each content.

The system further includes a tamper-proof unique identification module for unique and certain traceability of the container including one to 3 different systems among: a RFID-type radio-frequency identification tag, integrated into the container, unique identity card integrated into the container, a unique reference to a database formed by a chain of ordered blocks, called blockchain, integrated into the container and readable or detectable from the outside by any wave system.

The system according to the invention interacts with a network, called private network, which hosts in a distributed manner a database formed by a chain of ordered blocks, and associated with a protocol for writing/reading and cryptographic validation of transactions performed on the private network. Such a database is better known by its English name blockchain, which is used in the following.

The speed of the conveyor is over 0.05 m/s. In general, the speed is in the range of 0.25 m/s Thanks to these arrangements, the system allows having irrefutable quality proof of the preparation of the order and of the initial content put in the container and without it being able to be inverted.

In one embodiment, the display device is configured to further display the content(s) of a container.

In one embodiment, the distance between the opening of the container and the image-capturing device is comprised between 20 and 1,000 cm. Preferably, in the range of 100 cm.

In one embodiment, the image-capturing device includes a flash or a wave emitter which is triggered during an image capture.

In one embodiment, it includes a data communication module which includes a data transceiver making the information of the processing module accessible.

The communication module is a mobile or wired network terminal for exchanging data with at least one of the following elements: server, computer, smartphone (English term for mobile phone), digital tablet, cloud (storage alternative developed in the cloud, called the cloud), and the Internet. The data exchange also allows accessing it via a mobile application.

In one embodiment, it includes a device for closure by setting a first label configured to be torn or altered when opening the container (single use).

In one embodiment, the data processing module associates time information with the first label.

In one embodiment, the data processing module is configured to associate time information with the first label and the second label.

In one embodiment, it includes a device for closure by firm gluing, with a greater robustness than the weakest robustness of the materials and seams making up the container, not allowing the container to be opened without tearing it, altering it irreversibly.

For example, the first label is a stamp or other like a wax or the same, an unbroken and glued thread, a special label having indelible marks when it is torn, . . . .

In one embodiment, the first label includes a series of tensioned closed threads glued or integrated in any way whatsoever into the material of the container and running therearound, the different films forming therebetween at their intersection minimum angles of 30°, or the intersections of the same films forming therebetween at their intersection minimum angles of 30°.

In one embodiment, it includes a device for closure by setting a first label and a second label, said second label being a label related to the first label.

In one embodiment, the data processing module associates contextual information from the first label and/or from the second label: geographical locations (Site, production or packaging or order preparation line, . . . ).

In one embodiment, the data processing module associates information from an agent having carried out the first labelling and/or the second labelling: a machine with its identifier (serial number, etc.), a person having carried out the operation with his unique identifier, a batch of a multi-machine process with its unique number or identifier, etc.

In one embodiment, the system includes an integrated device for tracing the inner or outer physical measurements positioned in at least one of the following elements: the container or the content.

In one embodiment, the container possesses an integrated device for tracing the inner or outer physical measurements: calorific energy and the quantities allowing measuring it, light energy and the quantities allowing measuring it, electrostatic energy and the quantities allowing measuring it, electrical energy and the quantities allowing measuring it, gravitational potential energy and the quantities allowing measuring it, kinetic energy and the quantities allowing measuring it, radiant energy and the quantities allowing measuring it, the constitution of the liquid or gaseous element that surrounds the contents in the container (hydrometry, inert gas . . . ).

In one embodiment, one or more content(s) possess(es) an integrated device for tracing the physical measurements (calorific energy and the quantities allowing measuring it, light energy and the quantities allowing measuring it, electrostatic energy and the quantities allowing measuring it, electrical energy and the quantities allowing measuring it, gravitational potential energy and the quantities allowing measuring it, kinetic energy and the quantities allowing measuring it, radiant energy and the quantities allowing measuring it . . . ).

In one embodiment, an integrated device for tracing the physical measurements (calorific energy and the quantities allowing measuring it, light energy and the quantities allowing measuring it, electrostatic energy and the quantities allowing measuring it, electrical energy and the quantities allowing measuring it, gravitational potential energy and the quantities allowing measuring it, kinetic energy and the quantities allowing measuring it, radiant energy and the quantities allowing measuring it . . . ) is placed in the container in the same way as the content.

In one embodiment, said system has the ability to trace the content in a container:
  the changes and evolutions in the physical measurements (calorific energy and the quantities allowing measuring it, light energy and the quantities allowing measuring it, electrostatic energy and the quantities allowing measuring it, electrical energy and the quantities allowing measuring it, gravitational potential energy and the quantities allowing measuring it, kinetic energy and the quantities allowing measuring it, radiant energy and the quantities allowing measuring it . . . ) of the environment within the container during storage thereof or movements thereof or transport thereof;
  the evolution of these evolutions over time; and
  the correlation of these evolutions with different external events acting on the container.

In one embodiment, the system includes an integrated geolocation device positioned in at least one of the following elements: the container or the content.

In other words, according to one embodiment, the container has an integrated geolocation device.

According to another embodiment, one or more content(s) possess(es) an integrated geolocation device.

In one embodiment, an integrated geolocation device is placed in the container in the same way as the content.

BRIEF DESCRIPTION OF THE FIGURES

Other advantages, aims and features of the present invention will appear from the following description made, for an explanatory and non-limiting purpose, with reference to the appended drawings, wherein:

FIG. 1 represents a diagram of the system for capturing images of an open container moving on a conveyor which is the object of the present invention.

DESCRIPTION OF THE EMBODIMENTS

FIG. 1 shows a diagram of the system for capturing images of an open container 24 moving on a conveyor 23.

The principle is to automatically capture images of the open containers 24 or cardboard boxes passing on a conveyor 23.

The system allows performing a timestamping on closure.

This FIGURE shows an image-capturing device 25.

A barcode reader 21 allows identifying each cardboard box. The photo of the open cardboard box is then associated with the read cardboard box SSCC (standing for Serial Shipping Container Code or package sequential number) code.

The concept of proximal of the image-capturing device is explained by the triggering of the image captures: triggering is done either by the barcode reader 21 or by the analysis of the image-capturing device 25.

The end of the image capture is done according to the same principles or by an operator button.

According to another example, there are several barcode reader systems.

Reading of the barcode is triggered by a cell which assumes that the cardboard boxes are mechanically separated on the conveyor 23 (no contiguous cardboard boxes).

The system is fully integrated and consists by the following elements:
- a glazed cabinet inside which a camera+integrated lighting are positioned;
- a PC for control, in other words a processing unit;
- an electrical control portion (24V power supply, switch, PLC);
- a barcode reader 21;
- a display touchscreen 20;
- a status signal lamp to alert the operator in the event of a fault;
- a mechanical assembly supporting the assembly (Support 22 such as a jib with a stand made of aluminum profile).

The processing module includes control software which displays the last captured photo, in the event of unread barcodes or a not started application, an all or nothing signal allows stopping the conveyor.

A signal lamp with a buzzer (audible warning device) alerts the operator in the event of a fault.

According to one variant, the image-capturing device is a color industrial camera. This camera is coupled with an integrated lighting.

The processing module includes the following aspects:
- read the encrypted data and images uploaded by the image-capturing device 25 via a search engine allowing searches via keywords such as: package number, customer, . . . .
- store information for a predefined period when ordering the service;
- secure data;
- provide access to several authorized users to perform proof photo search operations (via the package SSCC number or a key jointly defined during the integration phase);
- send links to proof photos to emails or urls;
- provide access to users of client companies or partner companies, within the limit of the number of users of the present proposal.

A mobile application connected in real-time to the system allows providing access to the image captures.

The system includes a device for closure by setting a first label.

The first label corresponds to a closure stamp which is associated with a timestamp. For example, the first label is a seal or other like a wax or the same, an unbroken and glued thread, a label . . . .

The system triggers an image capture after closure of the container 24 by the closure device. The image capture is done after this closure operation and time information is associated with the captured image data.

According to one variant, the system includes a device for closure by setting a second label. The second label is a label related to the first label. The link is a virtual link, i.e., the timestamped data of the captured image of the first label is related to the timestamped data of the captured image of the second label.

The joint reading of the two labels assures on the non-infringement of the content.

Here are the operating steps of the system:
- a labelled cardboard box arrives;
- the operator has a list of goods to put in and puts them in;
- capture of an image with a timestamp (time information), recognition of the cardboard box (label) allows having the list of packages;
- filming of the packaging operation;
- closure of the container;
- either stamping or labelling 1;
- either gluing the label 2 computer-related to the label 1.

LIST OF THE REFERENCE SIGNS

TABLE 1

| References | Designations |
| --- | --- |
| 20 | screen |
| 21 | barcode reader |
| 22 | support |
| 23 | conveyor |
| 24 | container |
| 25 | image-capturing device |

The invention claimed is:

1. A system to capture images of an open container moving on a conveyor, comprising:
a conveyor;
an open container including at least one content;
an image-capturing device located above the open container to capture images;
a barcode reader configured to read a barcode located on an external face of the open container;
a display device configured to display at least one image and the barcode of the open container;
a content identifier configured to uniquely identify each content;
a processing unit configured to:

store the images with an identification of the barcode of the open container and a unique identification of said each content in a processing database;

associate time information with image data derived from each image captured by the image-capturing device;

a closure device to seal the open container and attach a first label to the sealed container, the first label configured to leave an indelible mark when torn or altered to open the sealed container; and wherein the processing unit is configured to trigger an image capture when the open container is proximal to the image-capturing device during movement of the conveyor.

2. The system of claim 1, wherein the content identifier is configured to identify at least one of the following elements:

a radio-frequency identification tag integrated into the open container;

a unique identity card integrated into the open container; and a blockchain, a unique reference to a database formed by a chain of ordered blocks, integrated into the open container and readable or detectable from the outside by a wave system.

3. The system of claim 1, wherein the content identifier is configured to identify a shape or a level within the open container.

4. The system of claim 1, wherein the content identifier is configured to identify at least one of the following elements:

a radio-frequency identification tag integrated into said each content;

a barcode or two-dimensional barcode;

a unique identity card integrated into said each content; and a blockchain, a unique reference to a database formed by a chain of ordered blocks, integrated into said each content and readable or detectable from the outside by a wave system.

5. The system of claim 1, wherein the display device is configured to display said at least one content of the open container.

6. The system of claim 1, wherein a distance between an opening of the open container and the image-capturing device is between 20 and 1,000 cm.

7. The system of claim 1, wherein the image-capturing device comprises a flash or a wave emitter which is triggered during the image capture.

8. The system of claim 1, further comprising a network terminal comprising a data transceiver making the information of the processing module accessible.

9. The system of claim 1, wherein the first label comprises a series of tensioned closed threads glued or integrated into a material of the sealed container.

10. The system of claim 1, wherein the processing unit is configured to associate the time information with the first label.

11. The system of claim 1, wherein the closure device is configured to attach a second label to the sealed container, the second label being related to the first label.

12. The system of claim 11, wherein the processing unit is configured to associate the time information with the first label and the second label.

13. The system of claim 1, further comprising an integrated device to trace inner or outer physical measurements positioned in at least one of the following elements: the open container and said at least one content.

14. The system of claim 1, further comprising an integrated geolocation device positioned in at least one of the following elements: the open container and said at least one content.

* * * * *